United States Patent
Yang

[11] Patent Number: 5,966,000
[45] Date of Patent: Oct. 12, 1999

[54] STORAGE BATTERY AUXILIARY CHARGING SYSTEM WITH SURVEILLANCE FUNCTIONS

[76] Inventor: Tai-Her Yang, No. 32, Lane 29, Taipin St., Si-Hu Town Dzan-Hwa, Taiwan

[21] Appl. No.: 08/864,918

[22] Filed: May 29, 1997

Related U.S. Application Data

[63] Continuation-in-part of application No. 08/633,319, Apr. 17, 1996, abandoned.

[51] Int. Cl.[6] ........................................... H02P 9/04
[52] U.S. Cl. ............................. 322/23; 322/16; 290/40 C; 180/65.8
[58] Field of Search ................................ 290/40 C, 40 A, 290/50; 322/14, 15, 16, 23; 320/123; 180/65.8

[56] References Cited

U.S. PATENT DOCUMENTS

| | | | |
|---|---|---|---|
| 3,719,881 | 3/1973 | Shibata et al. ............................. | 320/62 |
| 5,159,259 | 10/1992 | Hart et al. .................................. | 320/62 |
| 5,373,219 | 12/1994 | Grabowski et al. ..................... | 318/139 |
| 5,545,928 | 8/1996 | Kotani .................................... | 290/40 C |
| 5,550,445 | 8/1996 | Nii .......................................... | 318/153 |
| 5,566,774 | 10/1996 | Yoshida .................................. | 180/65.4 |
| 5,646,510 | 7/1997 | Kumar ...................................... | 322/16 |
| 5,650,713 | 7/1997 | Takeuchi et al. ......................... | 322/16 |
| 5,751,137 | 5/1998 | Kiuchi et al. .............................. | 322/14 |
| 5,786,640 | 7/1998 | Sakai et al. ............................... | 290/17 |
| 5,804,947 | 9/1998 | Nii et al. .................................. | 322/16 |
| 5,820,172 | 10/1998 | Brigham et al. ........................ | 290/40 C |

Primary Examiner—N. Ponomarenko
Attorney, Agent, or Firm—Bacon & Thomas

[57] ABSTRACT

An auxiliary power supply for a battery power system includes an engine-driven dynamo which provides auxiliary charging and power supply functions for maintaining optimal performance under a variety of conditions.

15 Claims, 4 Drawing Sheets

STORAGE BATTERY AUXILIARY CHARGING SYSTEM WITH SURVEILLANCE FUNCTIONS

CROSS-REFERENCE TO RELATED APPLICATION

This application is a continuation-in-part of application Ser. No. 08/633,319, filed Apr. 17, 1996, now abandoned.

BACKGROUND OF THE INVENTION

Storage batteries are commonly used in emergency power systems and power driven transporters because of their portability and relatively small size. However, to serve longer term loading requirements and enlarge battery capacities, an increase in cost and overall weight is inevitably incurred, and in addition, the serviceable life of the battery is decreased by exposure to discharging under heavy load conditions. The subject invention addresses these problems by providing auxiliary charging where needed to stationary or vehicle-carried batteries so as to keep them in adequately charged condition at all times and ready for all eventualities.

SUMMARY OF THE INVENTION

The subject invention provides an auxiliary power supply including an engine-driven dynamo for a battery power system, to provide various forms of auxiliary charging and power supply, so as to upgrade the power supply capabilities and provide optimal uninterrupted performance under a variety of conditions.

DETAILED DESCRIPTION OF THE PREFERRED EMBODIMENTS

Figure 1:
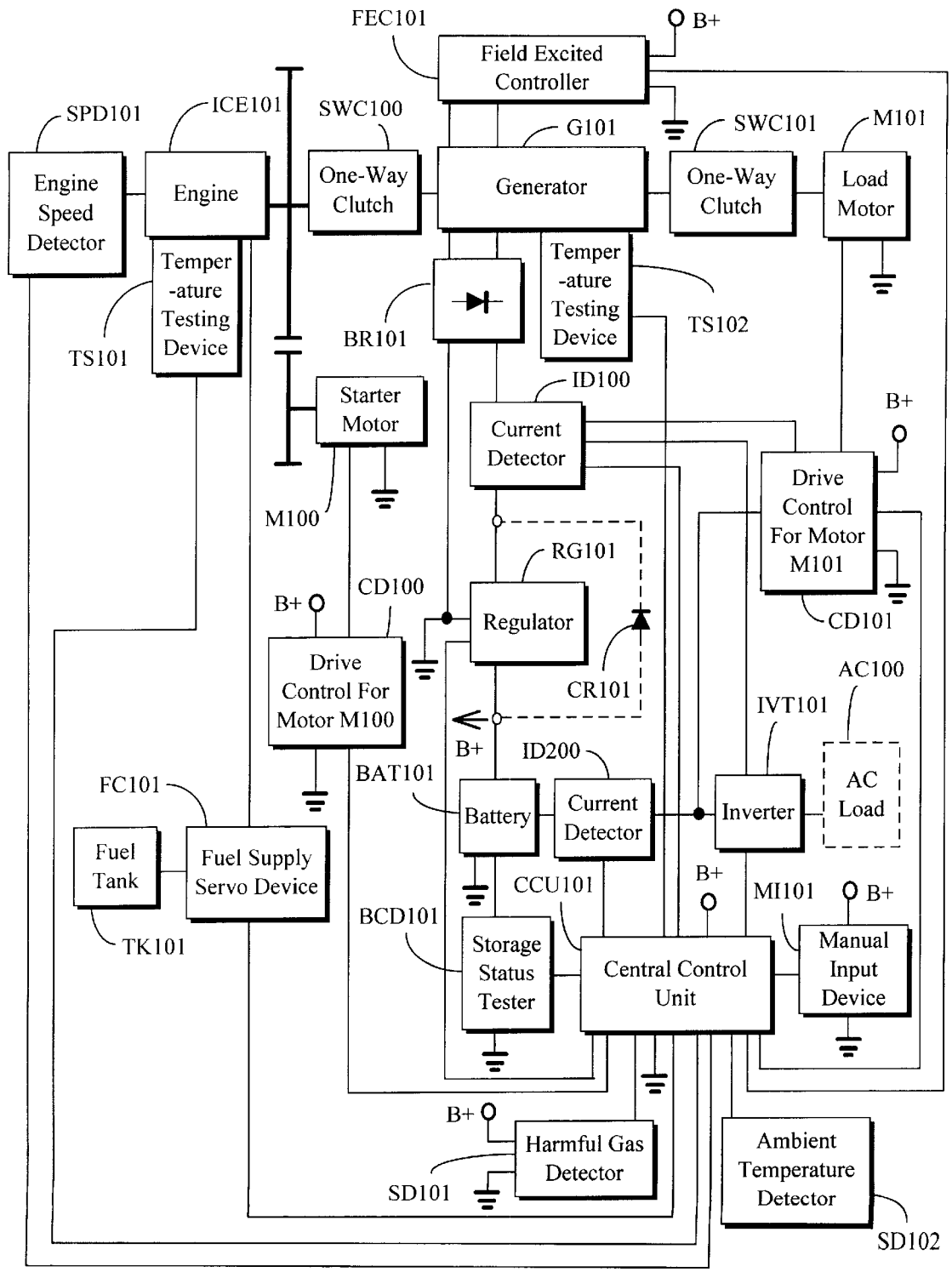
FIG. 1 is a block diagram of the preferred system.
Figure 2:
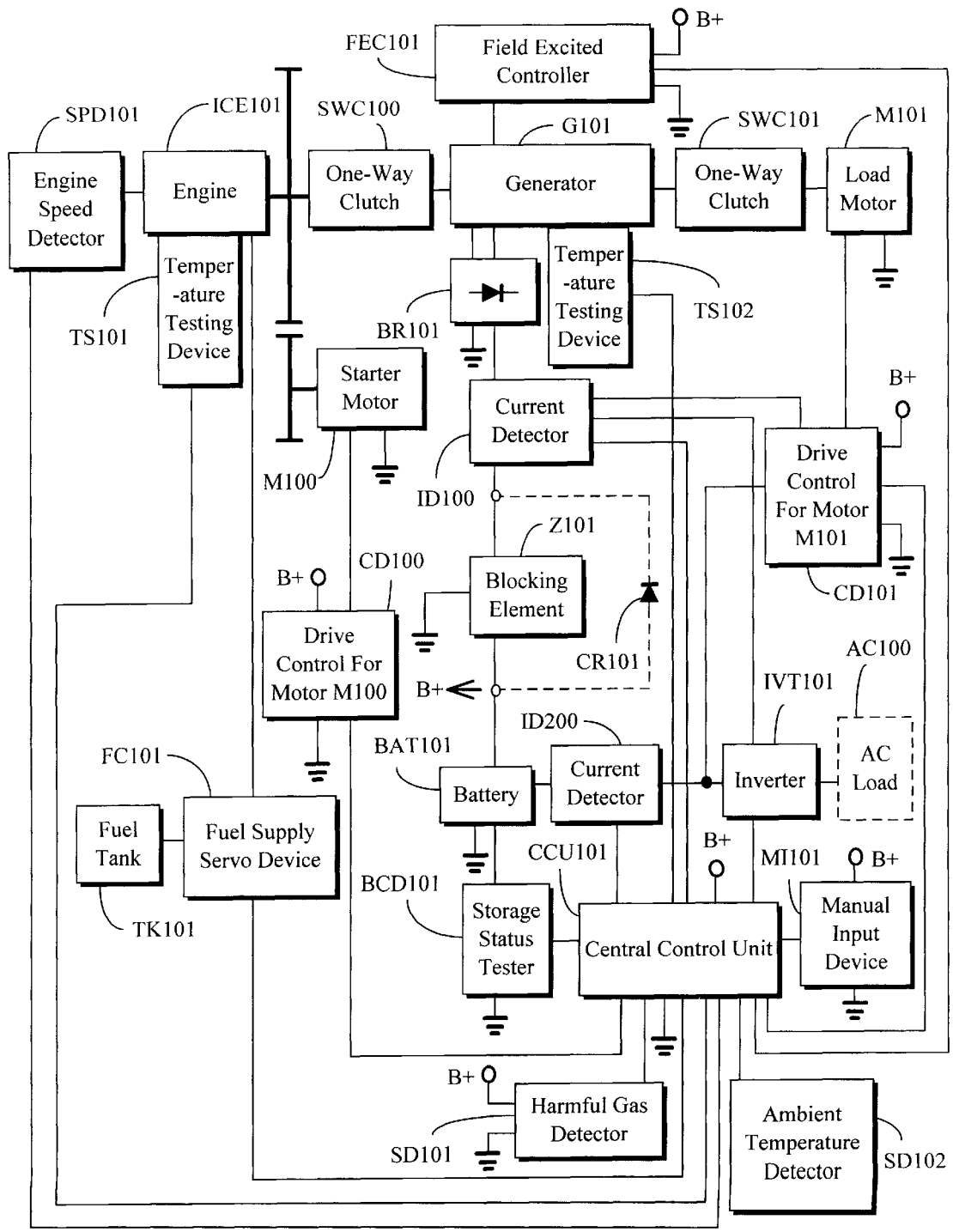
FIG. 2 is a block diagram of the preferred system, in which a blocking diode CR 101 and blocking element Z 101 are both provided to control battery potential and power generation.

Referring to FIG. 1, battery BAT 101 is a secondary battery capable of repeated charging/discharging recycling operations. It can, for example, be a plumbous acid, nickel/cadmium, nickel/nitrogen battery, or a nickel/zinc lithium system or zinc system battery, or any other secondary battery system having the required charging/discharging properties.

Storage status tester BCD 101 is provided to conduct continuous or periodic testing, or to output a digital or analog power signal for comparison with reference signals to detect charging, discharging, or static loading errors. The storage status tester can include mechanical or solid state electronic elements forming analogue testing circuits, or alternatively digitally testing circuits consisting of microprocessors and relevant software interfacing electronic elements, or else a combination of digital and analog circuits.

Regulator RG 101 is composed of mechanical or solid state electronic elements, depending on system requirements, and which, by referencing an output voltage/current from generator G 101 or alternatively receiving instructions from central control unit CCU 101, feeds back the output power to the prime generator G 101.

Current detector ID 100 is connected in series to the output terminal of generator G 101, and includes current sampling means made up of resistive or conductive elements, magnetic field sensors, heat accumulation sensors, or electromagnetic effect sensors capable of yielding current testing values to be converted into analog signals with which to produce an output current for the generator G 101 being tested, or an input current under specific conditions. Detector ID 100 thus can be used to control or regulate the regulator RG 101, or its output can be fed back to CCU 101 so as to control in turn the operation of generator G 101.

An optional detector ID 200 is series connected between input/output terminals of battery BAT 101 and the transmission control CD 101 or rectifier IVT 101, with current sampling means made up of a purely resistive element, a conductive element, or a combination of both, or by devices capable of producing analog signals representative of measured currents based on heat accumulation, indirect magnetic effects, or the like, for testing the output or input current of the battery to be tested, and then feeding the results to transmission control CD 101 or to CCU 101, so as to control the output power of battery BAT 101.

Engine ICE 101 can take the form of a rotating or reciprocating internal combustion engine that converts gasoline, diesel oil, or other gaseous liquid fuel for dynamic output power, and generator G 101 can be an armatured or non-armatured mechanism for generating D.C. or A.C. currents to convert the incoming engine revolving power into electrical power. In the case of a single phase or multiple phase A.C. generator, the output of generator G 101 may be converted through rectification at rectifier BR 101 into a D.C. output to drive the load motor M 101 and to charge the batteries.

Field excited controller FEC 101, which can be made up of mechanical or solid state elements, controls the power output of an A.C. or D.C. generator of the type including field excitation windings based on a generator output status and input from a manual control device MI 101 and/or CCU 101 settings, so as to achieve regulatory control of the voltage, current or power rate. This controller is omitted in the case where the generator poles are of the permanent magnet type.

Engine speed detector SPD 101, which can be analog or digital, converts angular displacements into corresponding electric signals in electromagnetic or photoelectric forms so as to feed engine speed signals back to CCU 101, and consequently regulates the supply of fuel from servomechanism FC 101 to engine ICE 101. The signal value of this device can be replaced by an analogous voltage or frequency value as necessary, or engine speed detector SPD 101 can be made of a mechanical structure, such as, for example, a centrifugal testing structure or other mechanical structure, and made to interact mechanically with fuel supply servomechanism FC 101 so as to bring engine ICE 101 into fixed speed rotation, depending on the nature of the system involved.

Fuel tank TK 101 where engine fuel is stored is connected to engine set ICE 101 by means of a fuel line and fuel supply servo device FC 101 interconnected therebetween.

Starter motor M 100 may be a synchronous or asynchronous A.C. or D.C. electrical motor, with or without an armature to receive input power so as to generate rotational power to start the engine ICE 101. Fuel supply servo device FC 101 receives electric power servo instructions or alternatively mechanical interaction as indicated above, so as to control the fuel supply to engine ICE 101, and in turn to regulate rotation speed and torque on the part of engine ICE 101, depending on system makeup.

Drive control CD 100 may be comprised of mechanical or solid state power elements and associated circuits to drive starter motor M 100 into operation or else to stop its operation. Similarly, drive control CD 101 also may be composed of mechanical or solid state elements and associated circuits to control the load motor M 101 for forward/reverse rotation, speed regulation, startup and stop functioning, depending on system requirements.

Load motor M 101 may be an A.C. or D.C. armatured or non-armatured, synchronous or asynchronous motor, capable of forward rotation, reverse rotation, speed regulation, stopping, and like functions. Load motor M 101 may also be made to consist of other loads depending on system requirements.

Auxiliary power supply B+ may be connected to battery BAT 101 or with an additionally provided battery set serving as the auxiliary power supply, or may be derived from dynamo generation. It supplies power to central control unit CCU 101, manual control unit MI 101, drive control CD 101 for load motor M 101, harmful gas detector SD 101, drive control CD 101 for starter motor M 100, field excitation controller FEC 101, regulator RG 101, and/or other devices such as lighting facilities. In the case where an auxiliary battery is provided, the generator G 101 may be additionally furnished with corresponding windings to facilitate charging of the auxiliary battery.

A D.C. to A.C. inverter IVT 101 composed of solid state power elements and associated circuits may be included to convert D.C. power into A.C. power so as to empower optional A.C. loads AC 100, depending on system requirements.

Central control unit CCU 101 may be composed of mechanical or solid state elements which form either an analog or digital structure or a combined analog and digital structure, or a microprocessor comprising operation and control software, a D-A converter, an A-D converter, or other associated circuit elements, with internal operation modes set to respond to instructions from manual control device MI 101 or to feedback signals so as to govern interactions between generator G 101, battery BAT 101, load motor M 101, or other loads in the control system, as well as other associated devices, for a regulated operation.

Manual control device MI 101 may also be made up of mechanical or solid state elements in combined or separate analog or digital modes for supplying signals to the central control unit so as to control the overall system operation, depending on system requirements.

Harmful gas detector SD 101 detects the concentration of harmful gases, if any, in the surrounding environment when charging is in progress, and is connected to the engine ICE 101 to stop operation thereof whether in manual control mode or in an automatic mode of activation, so that operation is stopped whenever the detected concentration of harmful gases exceeds a safety margin, but allowed to continue when a reading from the detector falls within tolerance, as dictated by system requirements.

Ambient temperature detector SD 102 may be made up of temperature sensors plus mechanical or solid state components, intended for automatic detection of ambient temperatures, with the output transmitted to CCU 101 so that charging is suspended, and other forms of operation stopped, when the ambient temperature exceeds a given threshold value, and so that continued system operation is allowed where the ambient temperature is found to be within rated working temperature ranges dependent on system requirements.

The above-described components are essentially designed to maintain the storage battery BAT 101 in adequately charged condition by using an engine-driven dynamo or generator G 101 as its power supply, so as to offer timely auxiliary charging power to transmit to a load motor or other loads, such as stationary or carrier-laden batteries. In operation, testing measurements are made based on manual control modes or on a central control unit programmed for the purpose, to assess the battery storage condition, the testing signals thus obtained being compared with a control or programmed value to effect commensurate controlled operation of the engine driven generator G 101, to obtain the following functions:

(1) The above-described invention has the ability to charge and initiate motor and engine operation and charge the battery exclusively through the generator when, by testing the battery saturation state, the battery storage level is confirmed to have fallen down to preset level.

(2) The invention also has the ability to deliver power to the load motor or other loads and to the storage battery based on the result of testing the storage battery saturation state and comparing it with the modes of operation programmed in the central control unit, followed by output of rated or ratable power, or of fixed current or controlled current, by correspondent control of the generator so that the loading factor is matched, or through proportionate apportioning of currents supplied to both the load and the storage battery, with the possibility of switching automatically to function (3) described hereinafter when the aggregate load has exceeded the generator's capacity, while switching back to the prime operating regime when the load drops to a level below the generator capacity.

(3) The invention also has the ability to effect relative control of the generator for a fixed or controlled current output, for a fixed power factor, or a controlled power factor output, based on the current storage condition of the storage battery, so as to apportion loads, in a controlled manner, to the generator and the battery based on the generator power factor and loading factor, or on both currents, so that the generator and storage battery will jointly drive the load motor or other loads, and eventually to switch to function (2) described hereinbefore when the load has been reduced with the loading factor downgraded to a level below the generator power factor, but reverting to its prime function when the load power consumption reaches a level that is greater than the generator capacity.

(4) The invention also has the ability to verify load current status of the load motor when driven by the battery alone, such that once the power factor of the load motor or other load rises to a level beyond a set value or beyond a set time, the engine and generator are automatically driven and the modes of operation programmed in the central control unit function to bring about operation under a fixed or controlled current, or a fixed or controlled power rate, in order to drive the load jointly with the storage battery. In addition, operation of engine dynamo is stopped, followed by continued supply of power from the storage battery to the load motor or other load, once the load motor or other load power factor resumes a normal rating after the set time has elapsed.

(5) The invention also has the ability to drive the engine and generator in response to manipulation of the manual control so that the generator with its output may singly drive the load motor or other load, and so that when the load on the load motor increases, the power stored in the battery may jointly drive the load together with the generator produced power, and further so that, once the motor load returns to normal, the battery will stop outputting power, at which time the load is driven instead by power coming from the engine dynamo.

(6) The invention also has the ability to accept manipulation from the manual control unit so as to initiate engine and dynamo operation for a fixed or controlled current, or a fixed power rate, or to control power rate generation so as to drive the load motor and charge the storage battery in a manner proportional to the matched generation power rate and the load rate or, alternatively, to match the current supplied in both cases, with the possibility of switching automatically to function mode (7) when the load is at a level beyond the generator capacity, and then reverting to prime functional running once the load returns to a level below generator capacity.

(7) The invention also has the ability to accept manipulation from the manual control unit so as to initiate engine and dynamo operation for fixed current, controlled current, or a fixed power rate, or controlled power rate generation so as to cause the dynamo and battery to jointly drive the load motor or other load based on generated power, loading power, or current with proportional distribution, to return operation to function (6) when the load is reduced and the loading power is less than the generation power, and to revert to its prime function mode when the load power exceeds the generation power rate.

(8) The invention also has the ability to accept manipulation from the manual control unit so as to cause the engine and dynamo to selectively charge the battery.

(9) The invention also has the ability to accept manipulation from the manual control unit so as to cause the engine and dynamo to charge the battery for individually programmed charging times, to limit charging currents to the battery, power factor to the battery, and to trigger suspension of charging by the engine dynamo, with control of charging time in this connection including control of supplemental or saturation charging, or emergency charging.

(10) The invention is also capable of stopping operation of the engine and dynamo as the battery reaches a predetermined saturation, as determined in the course of operation under aforementioned functions (1), (8), or (9).

(11) The invention also has the ability to stop charging with respect to the battery without affecting power being output from the engine dynamo to the load motor either through manipulation of the manual control unit or by means of the central control unit once the battery reaches a predetermined saturation point, verified in the course of operations run under above-described function (2) or (6).

(12) The invention also has the ability to stop operation of the engine dynamo so that the power output is delivered to the load motor away from the battery through manipulation either of the manual control unit or the central control unit once the battery reaches a predetermined saturation point, verified in the course of operations run under functions (2) or (6).

(13) The invention also enables the engine dynamo to continue operation concurrently with the battery by shifting from a charging status to jointly deliver input power with the dynamo to the load motor either through manipulation of the manual control unit or by means of the central control unit once the battery reaches a predetermined saturation point, verified in the course of operations run under function (2) or (6).

(14) The invention also has the ability to relatively regulate the generator's power generation rate based on a charging current signal generated based on testing conducted when the generator solely charges the battery or concurrently delivers power to the load motor while charging the battery at the same time, during operation under functions (1), (2), (6, (8), or (9).

(15) The invention provides for surveillance of peripheral harmful gases by testing the concentration of peripheral harmful gases so that, once a critical value is exceeded, charging and other functional operations are stopped, and only restarted once the reading of harmful gases has dropped to a level below the critical one, the testing being conducted when charging is run under automatic or manual control, or alternatively when other functional operations are in progress, by means of the harmful gas detector.

(16) Surveillance of ambient temperature is also carried out by the invention, with the output of the ambient temperature detector being used to stop charging or other operations when the temperature exceeds a predetermined value while allowing other modes of operation within the normal temperature range, and by causing the engine and generator to be shifted automatically to a shutdown status when the temperature drops too low, so as to maintain a sustaining charge for the battery such that the latter is maintained in readiness to serve condition in all eventualities.

When the subject system is running under functions (2) or (6), with output power of generator G 101 in parallel with battery BAT 101, a disparity in battery saturation status will have the effect that generator G 101 becomes a surge charger with respect to battery BAT 101 when the battery is at a relatively lower capacity level, at which time the system operates by means of the following control circuits:

A forward series blocking diode CR 101 is connected between the output terminal of BAT 101 and the D.C. output terminal of generator G 101, or of rectifier BR 101, and in parallel with regulator RG 101, so that RG 101 is made active to regulate the charging power supply from the generator to the battery. RG 101 may further be adapted to receive control signals emitted by CCU 101 based on a test outcome from battery storage detector BCD 101 so as to allow for regulation of charging rates of currents, and for control of startup or stopping of charging functions.

More specifically, the blocking diode CR 101 may be connected in forward series to BAT 101, to thereby form a parallel output with the D.C. output terminal or rectifier output as illustrated in FIG. 1.

The blocking diode CR 101 may be serially forward-connected to the output terminal of BAT 101, to thereby form a parallelled output with the D.C. output of a generator G 101 and/or rectifier BR 101, with a resistive or conductive or composite resistive/conductive impedance Z 101 placed in parallel connection across both ends of the blocking diode (see FIG. 1) in lieu of regulator RG 101, to restrict the passage of charging currents from the generator to the battery.

Figure 3:
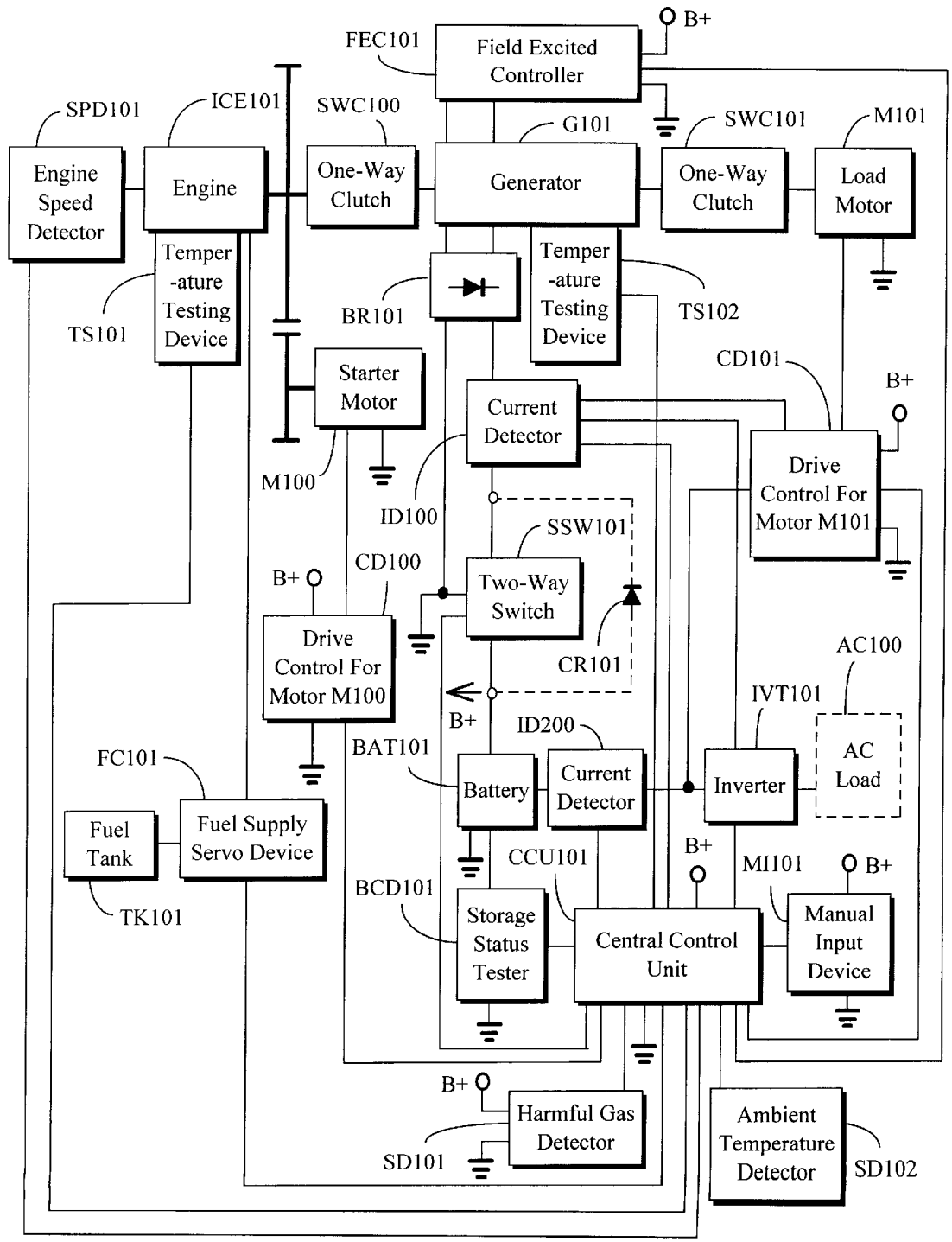
FIG. 3 is a block diagram of the preferred system in which a blocking diode CR 101 and operable two-way switch SSW 101 are provided to control battery potential and power generation.

The blocking diode CR 101 may be forward series connected at the output end of BAT 101, to form a parallel output across the D.C. output from generator G 101, while both ends of blocking diode CR 101 may be further (see FIG. 3) parallelled with a mechanical or solid state controllable two-way switch SSW 101 to permit open circuit or closed circuit alternative control across the output terminals of both BAT 101 and generator G 101 in lieu of regulator RG 101, and to allow control of charging current supplied from generator G 101 to battery BAT 101, and of the supply of power from BAT 101 to load motor M 101.

Figure 4:
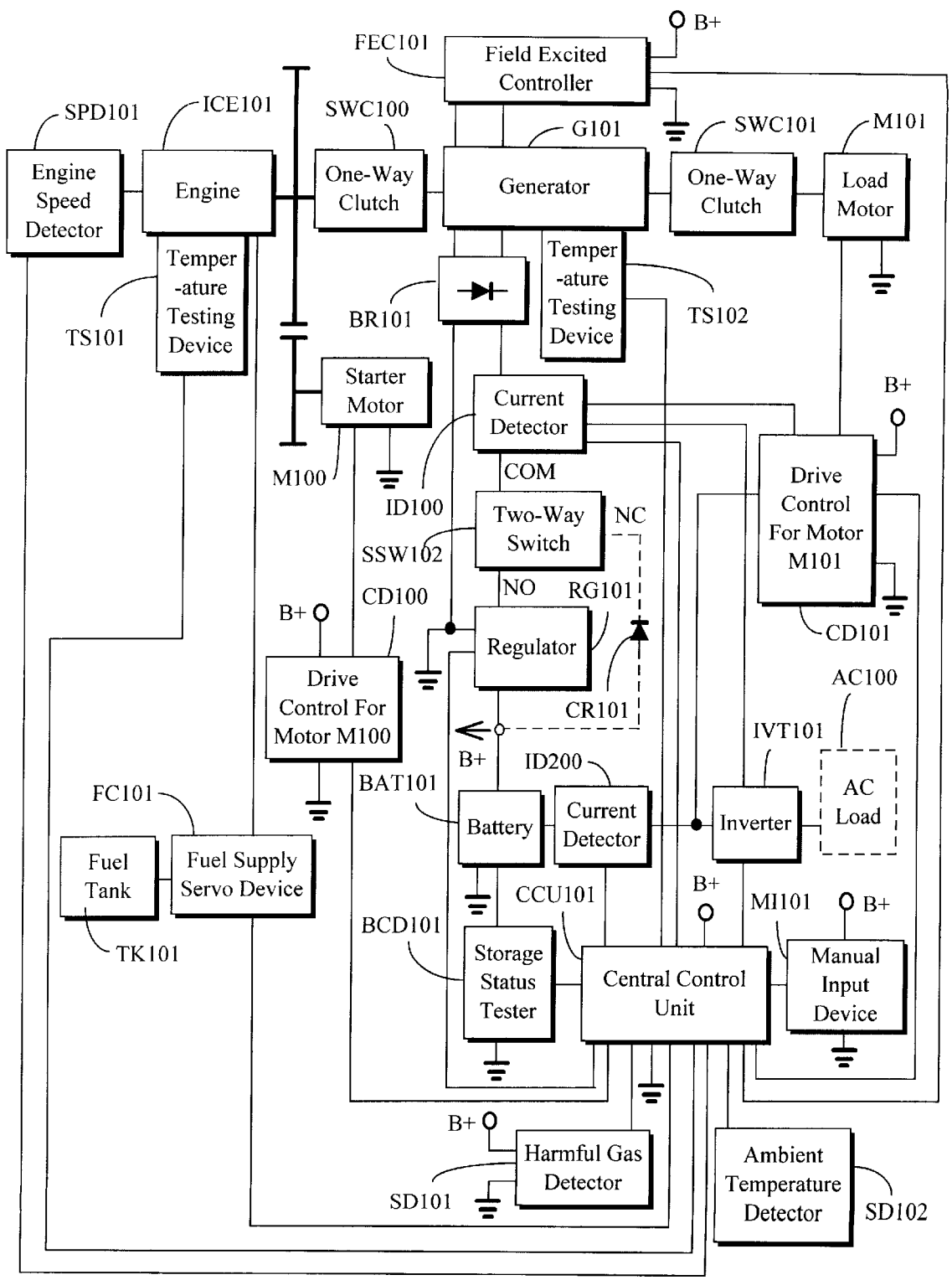
FIG. 4 is a block diagram of the preferred system in which blocking diode CR 101 and a regulator RG 101 are provided to control a contact switch SSW 102, and eventually to control battery potential and power generation.

The blocking diode CR 101 may also be connected in a forward series sense to the output end of BAT 101 permitting supply of D.C. power from generator G 101 to be governed by regulator RG 101, or alteratively, an impedance element Z 101 bearing the same function as controllable two-way switch SSW 101, and having the same polarity the charging supply terminal of the generator being connected to the output end of a common contact (COM) of SSW 102 and, as dictated by circuit requirements, may be severally connected to the NO point and NC points of the SSW 102 (FIG. 4), or alternatively a reversal of such a connection may be made so as to render possible control by generator G 101 of the output status to the battery and that of the battery to the load motor M 101 or other load.

In addition, because the subject system may be operated under various ambient temperature conditions, and because engines, as a rule, have to be warmed up prior to routine operation, all the more so in winter time, heat accumulated during operation having to be radiated, the system can be operated by the CCU or manual mode of operation as follows:

The generator may be restricted to yield an output only after the engine has been started for some time, that is, the generator output can be delayed following engine starting. Also, while the system is running continuously in operation, the engine may be maintained in an idle running warmup condition with no output power supplied by the generator, so as to prepare the system for output operation. Furthermore, when the entire system stops operation, the engine generator may continue to run in order to prevent accumulation of heat in the engine, and upon completion of heat dissipation, stop running altogether, and when the system is in operation, the engine generator may be subjected to control effected from temperature testing device TS 101 located in the engine or temperature testing device TS 102 located in the generator so that engine rotation is stopped, or alternatively is made to yield a lesser power output when the temperature is found to exceed a predetermined level.

While the system is running, and due to manipulation of the manual control or CCU automatic control the engine is set to a preparatory status or the system is in a prepare-to-stop condition, the engine can be driven to operate intermittently, based on an engine temperature that is predetermined in the CCU, so as to maintain a preparatory state advantageous to initiation of operation. Also, the engine generator set may serve as a cooling or heating temperature regulator of the pump type, driven by mechanical energy or by other peripheral devices transmittable by revolving mechanical drives which may, at the same time, as dictated by requirements, be selectively equipped with electric motor drive devices, and be driven by engine kinetics via transmitting clutches or one-way clutches.

Inclusion of a one-way transmission clutch SWC 100 between engine ICE 101 and generator G 101, with a further one-way transmission clutch SEC 101 installed between generator G 101 and load motor M 101 or another load, enables inertial idle running in one direction, capable of driving generator G 101, so that generator 101 can provide braking action as a result of recycled generation when the one-way transmission clutch SEC 100 is idling and so that when engine ICE 101 drives generator G 101 to operation, one-way transmission clutch SEC 101 will be idling. One-way transmission clutch may be replaced by artificial, mechanical, power driven or fluid powered clutching devices or a combination thereof, with a two-way clutch in a disengaged status being equivalent to a one-way clutch in an idle running status, and a two-way clutch is a closure state being equivalent to a one-way clutch in a disengaged state.

By way of the subject system described above, the storage battery can be maintained in a power storage condition that is better and more desirable than was previously possible, serving not only to optimize load operation, but also to avoid over-discharging the storage battery, thus achieving eventually the ultimate goal of prolonged service life of the battery assembly as a whole.

I claim:

1. A storage battery auxiliary charging system with surveillance functions, comprising:

a secondary battery capable of repeated charging/discharging recycling operations;

a storage status tester arranged to detect charging, discharging, or static loading errors during said repeated charging/discharging recycling operations;

a generator arranged to charge said secondary battery;

a current detector connected in series to an output terminal of said generator, and arranged to control an output of the generator;

an engine;

an engine speed detector arranged to detect angular displacements of the engine and thereby regulate a supply of fuel from a servomechanism to the engine;

a starter motor arranged to generate rotational power to start the engine;

a fuel supply servo device arranged to control the fuel supply to engine and thereby regulate engine rotation speed and torque;

a drive controller arranged to drive said starter motor;

a load motor capable at least of forward rotation, reverse rotation, speed regulation, and stopping functions;

a drive controller arranged to drive said load motor;

an auxiliary power supply arranged to supply power to a central control unit, a manual control unit, said drive controller, and other auxiliary devices and detectors;

a central control unit arranged to respond to instructions from a manual control device and to feedback signals so as to govern interactions between said generator, secondary battery, load motor, or other loads in the control system, as well as other associated devices;

a harmful gas detector arranged to detect a concentration of harmful gases, in a surrounding environment when charging is in progress, and connected to the engine to stop operation thereof whether in manual control mode or in an automatic mode of activation, so that operation is stopped whenever the detected concentration of harmful gases exceeds a safety margin, but allowed to continue when a reading from the detector falls within tolerance; and an ambient temperature detector arranged to automatically detect ambient temperatures, with the output transmitted to the central control unit so that charging is suspended, and other forms of operation stopped, when the ambient temperature exceeds a given threshold value, and so that continued system operation is allowed where the ambient temperature is found to be within rated working temperature ranges, wherein said system not only charges and initiates motor and engine operation and charges the battery exclusively through the generator when, by testing the battery saturation state, the battery storage level is confirmed to have fallen down to preset level, but also is arranged to:

(i) deliver power to the load motor or other loads and to said secondary battery based on the result of testing said secondary battery saturation state and comparing it with modes of operation programmed in the central control unit, followed by output of rated or ratable power, or of fixed current or controlled current, by correspondent control of the generator so that the loading factor is matched, or through proportionate apportioning of currents supplied to both the load and said secondary battery, and further switching automatically to effect relative control of the generator when the aggregate load has exceeded the generator's capacity, while switching back to the prime operating regime when the load drops to a level below the generator capacity, (ii) effect a relative control of the generator for a fixed or controlled current output, for a fixed power factor, or a controlled power factor output, based on the current storage condition of said secondary battery, so as to apportion loads, in a controlled manner, to the generator and the battery based on the generator power factor and loading factor, or on both currents, so that the generator and storage battery will jointly drive the load motor or other loads, and eventually to switch to said function (i) when the load has been reduced with the loading factor downgraded to a level below the generator power factor, but reverting to its prime function when the load power consumption reaches a level that is greater than the generator capacity, (iii) verify load current status of the load motor when driven by the battery alone, such that once the power factor of the load motor or other load rises to a level beyond a set value or beyond a set time, the engine and generator are automatically driven and the modes of operation programmed in the central control unit function to bring about operation under a fixed or controlled current, or a fixed or controlled power rate, in order to drive the load jointly with said secondary battery, the operation of the generator also being stopped, followed by continued supply of power from said secondary battery to the load motor or other load, once the load motor or other load power factor resumes a normal rating after the set time has elapsed, (iv) drive the engine and generator in response to manipulation of the manual control so that the generator with its output may singly drive the load motor or another load, and so that when the load on the load motor increases, the power stored in the battery may jointly drive the load together with the generator produced power, and further so that, once the motor load returns to normal, the battery will stop outputting power, at which time the load is driven instead by power coming from the generator, (v) accept manipulation from the manual control unit so as to initiate engine and generator operation for a fixed or controlled current, or a fixed power rate, or to control power rate generation so as to drive the load motor and charge said secondary battery in a manner proportional to the matched generation power rate and the load rate or, alternatively, to match the current supplied in both cases, (vi) accept manipulation from the manual control unit so as to initiate engine and generator operation for fixed current, controlled current, or a fixed power rate, or controlled power rate generation so as to cause the generator and battery to jointly drive the load motor or other load based on generated power, loading power, or current with proportional distribution, to return operation to charge the battery when the load is reduced and the loading power is less than the generation power, and to revert to its prime function mode when the load power exceeds the generation power rate.

(vii) accept manipulation from the manual control unit so as to cause the engine and generator to selectively charge the battery, (viii) accept manipulation from the manual control unit so as to cause the engine and generator to charge the battery for individually programmed charging times, to limit charging currents to the battery, power factor to the battery, and to trigger suspension of charging by the generator, with control of charging time in this connection including control of supplemental or saturation charging, or emergency charging, (ix) stop operation of the engine and generator as the battery reaches a predetermined saturation, as determined in the course of operation under aforementioned functions (ii), (vii), or (ix), (x) stop charging with respect to the battery without affecting power being output from the generator to the load motor either through manipulation of the manual control unit or by means of the central control unit once the battery reaches a predetermined saturation point, verified in the course of operations run under above-described functions (i) or (v), (xi) stop operation of the generator so that the power output is delivered to the load motor away from the battery through manipulation either of the manual control unit or the central control unit once the battery reaches a predetermined saturation point, verified in the course of operations run under functions (i) or (vi).

(xii) enable the generator to continue operation concurrently with the battery by shifting from a charging status to jointly deliver input power with the generator to the load motor either through manipulation of the manual control unit or by means of the central control unit once the battery reaches a predetermined saturation point, verified in the course of operations run under function (i) or (vi), (xiii) relatively regulate the generator's power generation rate based on a charging current signal generated based on testing conducted when the generator solely charges the battery or concurrently delivers power to the load motor while charging the battery at the same time, during operation charging of the battery through the generator when battery storage level is confirmed to have fallen down to a preset level and under functions (i), (v), (vi), (vii), or (viii), (xiv) provide for surveillance of peripheral harmful gases by testing a concentration of peripheral harmful gases so that, once a critical value is exceeded, charging and other functional operations are stopped, and only restarted once the reading of harmful gases has dropped to a level below the critical one, the testing being conducted when charging is run under automatic or manual control, or alternatively when other functional operations are in progress, by means of the harmful gas detector, (xv) provide for surveillance of ambient temperature, with the output of the ambient temperature detector being used to stop charging or other operations when the temperature exceeds a predetermined value while allowing other modes of operation within the normal temperature range, and by causing the engine and generator to be shifted automatically to a shutdown status when the temperature drops too low, so as to maintain a sustaining charge for the battery such that the latter is maintained in readiness to serve condition in all eventualities.

2. A system as claimed in claim 1, wherein said generator is arranged to provide an electrical output only after a predetermined time has elapsed following starting of the engine.

3. A system as claimed in claim 1, wherein the system is arranged such that, when the system has been running continuously, the engine is maintained in a warmed-up condition by running the engine at idle speed in preparation for generator operation.

4. A system as claimed in claim 1, wherein the system is arranged such that, when the system stops power generation completely, peripheral cooling devices continue to perform heat dissipation to avoid engine heat accumulation, and upon completion of heat dissipation, engine operation is automatically stopped.

5. A system as claimed in claim 1, wherein the system is arranged such that, during system operation, the engine and generator are controlled by a temperature detector arranged to reduce power output if the temperature exceeds a predetermined limit.

6. A system as claimed in claim 1, wherein the engine is arranged to be intermittently operated to maintain a temperature set by said central control unit.

7. A system as claimed in claim 1, wherein said manual control unit is arranged to enable programming of charging times, maximum charging currents, and charging current power factor.

8. A system as claimed in claim 1, wherein said system is arranged such that once a critical value of harmful gases is exceeded, charging and other functional operations are stopped, and only restarted once the reading of harmful gases has dropped to a level below the critical one, the testing being conducted when charging is run under both automatic and manual control, or alternatively when other functional operations are in progress, by means of the harmful gas detector.

9. A system as claimed in claim 1, wherein said system is arranged such that output of the ambient temperature detector is used to stop charging or other operations when the temperature exceeds a predetermined value while allowing other modes of operation within the normal temperature range, and by causing the engine and generator to be shifted automatically to a shutdown status when the temperature drops too low, so as to maintain a sustaining charge for the battery.

10. A system as claimed in claim 1, further comprising a control circuit, said control circuit including a blocking diode connected in series between said battery and said generator, and an impedance connected in parallel with said blocking diode for restricting charging currents from the generator to the battery.

11. A system as claimed in claim 1, further comprising a regulator arranged to receive control signals from said central control unit to control an output of said generator based on an output of said current detector, said regulator being connected in parallel across ends of a forward series blocking diode connected to an output terminal of the battery.

12. A system as claimed in claim 1, wherein said blocking diode is connected in parallel with a two-way switch for pulse modulating currents from the generator to the battery.

13. A system as claimed in claim 1, further comprising a switch device connected in series between the generator and a voltage regulation device selected from the group consisting of a voltage regulator, impedance, or switch, said switch being connected between said blocking diode and said regulator.

14. A system as claimed in claim 1, further comprising a one-way transmission clutch connected between the engine and the generator, and a one-way transmission clutch connected between the generator and the load motor, wherein the engine idles when running in one direction, and wherein the load motor is capable of driving the generator to obtain power during a braking action.

15. A system as claimed in claim 1, further comprising clutches connected between said engine and generator, and between said generator and load motor, wherein once the clutches are disengaged, said engine and load motor run in an idle status, and wherein once said clutches are closed, said engine or said load motor can drive said generator.

* * * * *